UNITED STATES PATENT OFFICE.

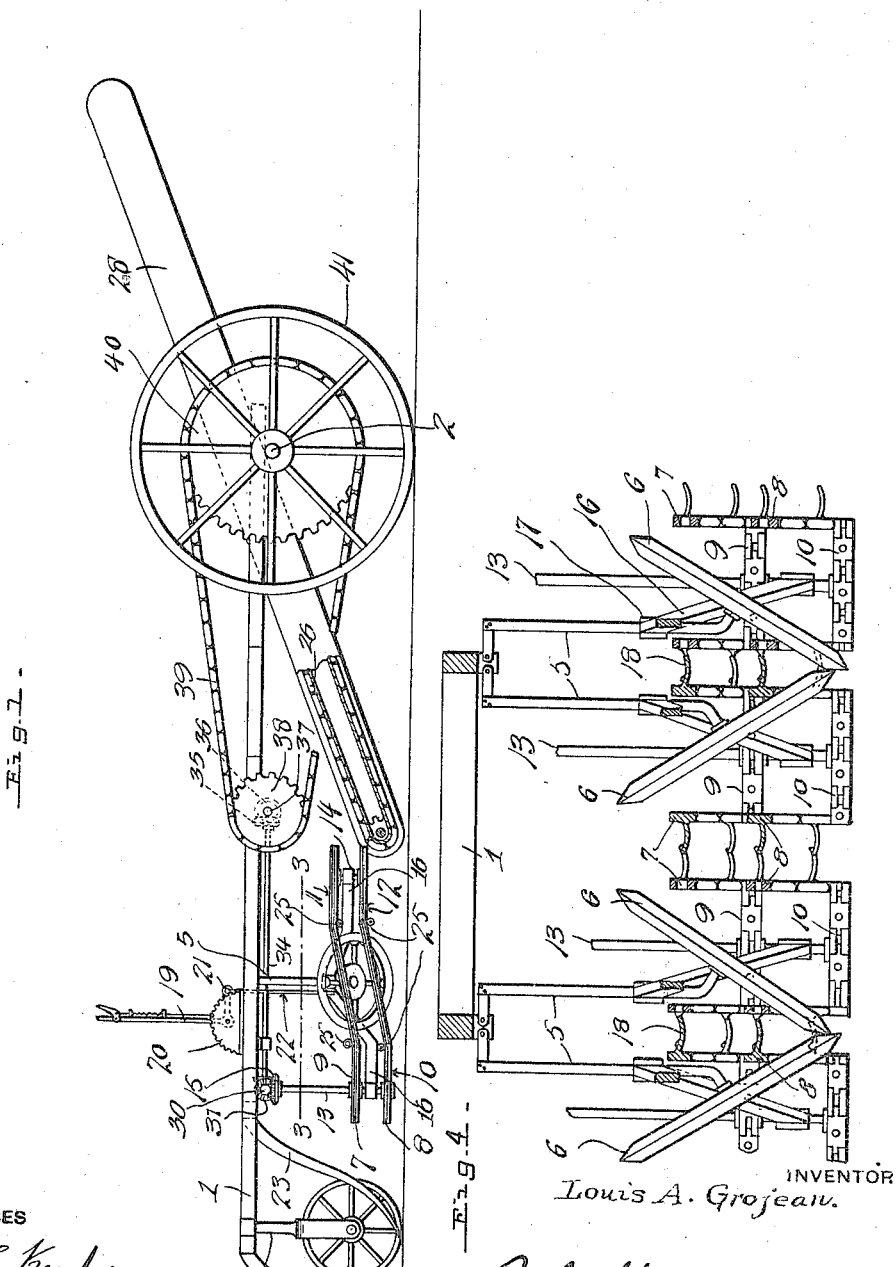

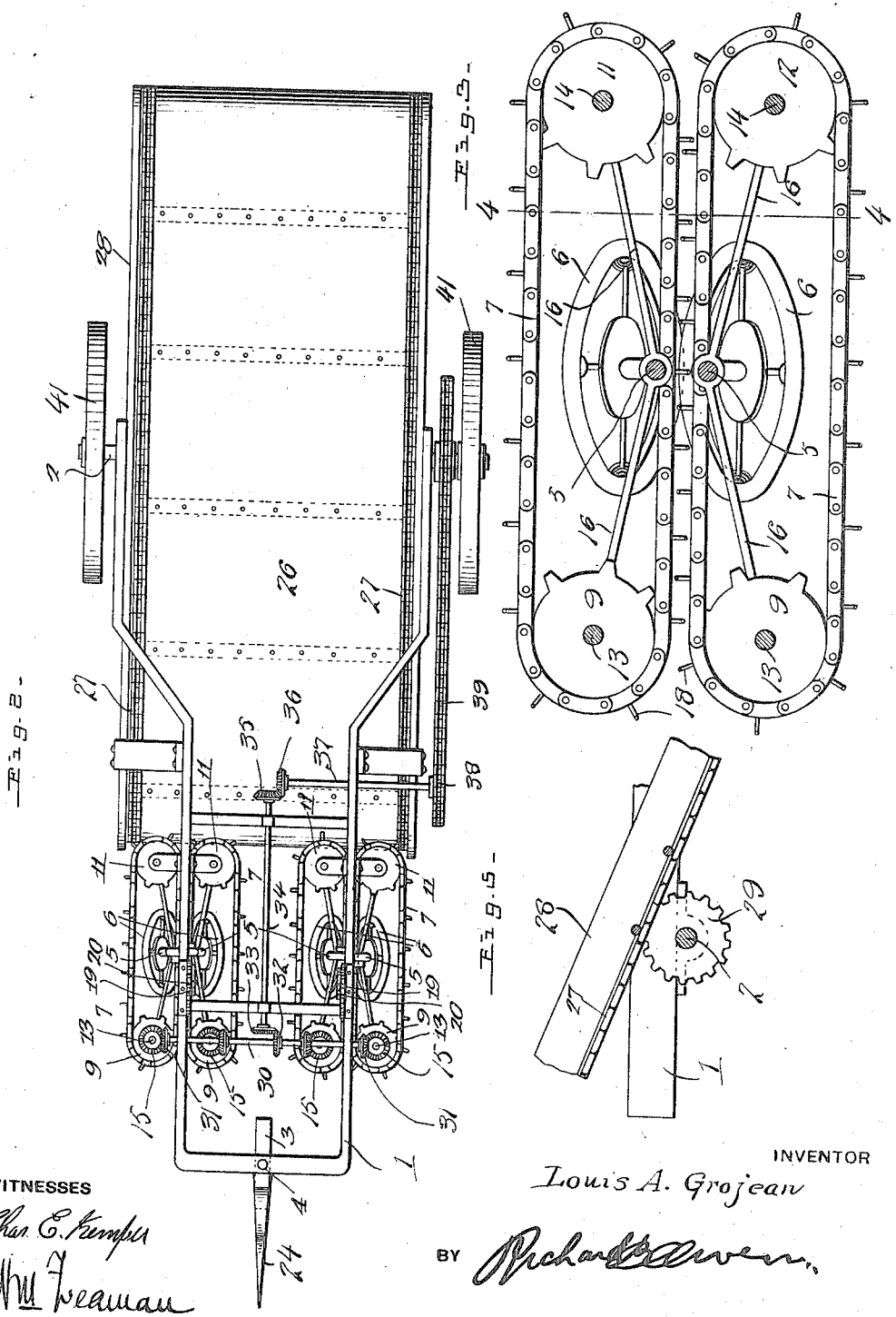

LOUIS A. GROJEAN, OF MARYSVILLE, CALIFORNIA.

BEAN-HARVESTER.

1,264,385.   Specification of Letters Patent.   Patented Apr. 30, 1918.

Application filed May 27, 1916. Serial No. 100,301.

*To all whom it may concern:*

Be it known that I, LOUIS A. GROJEAN, a citizen of the United States, residing at Marysville, in the county of Yuba and State of California, have invented certain new and useful Improvements in Bean-Harvesters, of which the following is a specification.

This invention relates to agricultural machines, with special reference to bean pulling and harvesting machines, and the nature and objects thereof will be readily apparent to those skilled in the art to which it appertains, in the light of the following explanation of the accompanying drawings, illustrating what I now believe to be the preferred embodiment or mechanical expression of my invention from among other forms and arrangements within the spirit thereof, or the scope of the appended claims.

However, an object of the invention is to provide a bean harvesting machine, embodying a new and novel means for severing the bean vines from their attachment to the soil, and for directing them toward and upon an ascending carrier, from which the vines are eventually deposited in convenient stacks, or receptacles from which they are subsequently taken and the beans removed therefrom.

In addition to the foregoing, my invention comprehends improvements in the details of construction and arrangement of parts to be hereinafter described and particularly pointed out in the appended claims.

In the accompanying drawings, in which similar and corresponding parts are designated by the same characters of reference throughout the several views in which they appear:

Figure 1 is a view in side elevation, partly broken away, of my improved bean harvester.

Fig. 2 is a view thereof in plan.

Fig. 3 is an enlarged horizontal section taken on the line 3—3 of Fig. 1.

Fig. 4 is a vertical transverse section taken on the line 4—4 of Fig. 3.

Fig. 5 is a detail section illustrating the driving mechanism for the carrier.

With reference to the drawings, 1 indicates a frame substantially U-shaped in plan, with its rearwardly directed terminals supported upon a transverse axle 2, in which frame said axle is journaled for rotation, and the forward part of the frame supported upon a wheel 3, journaled in a standard 4 depending from the frame.

My machine in its present embodiment is designed to harvest two rows of vines at one time, and I therefore provide two separate and independent vine pulling mechanisms at the forward part of the machine. As both of these mechanisms are identical in their construction, a description of one will suffice for both. Therefore 5 designates a pair of vertically disposed, horizontally spaced supporting shafts, having their lower terminals outwardly curved to support at said terminals a pair of cutting disks 6, which disks are disposed at an angle to each other and with their lower edges in cutting engagement. Upper and lower bean pulling chains 7 and 8 respectively, are horizontally disposed, a pair for each disk, said chains passing around upper and lower, forward and rear sprockets 9 and 10, and 11 and 12. Such sprockets are journaled upon forward and rear shafts 13 and 14 respectively, the shaft 13 being extended vertically and provided with bevel gears 15. The shafts, and the mechanism as a whole, are supported upon a frame comprising downwardly diverging arms 16, their point of connection being formed with a vertically apertured bearing 17 in which the shaft 5 is received. The lower ends of the arms 16 are formed with bearings in which the shafts of the sprockets are journaled.

The chains 7 and 8 are so disposed with relation to the disk 6, that the lower chains, which are horizontally spaced are disposed with the engaging edges of the disks in the space between the adjacent stretches of the lower chains, while the adjacent stretches of the upper chains are disposed within the upwardly diverging sides of the disks. The chains are formed or provided with teeth 18, said teeth being disposed in inter-spacial relation on the adjacent stretches thereof. A lever 19 is pivotally connected in operable relation to a segment 20 secured to the frame, said lever having a right angle portion 21, the extremity of which is connected by means of a link 22 to an adjacent pair of frames, of which the arms 16 form a part. Such a lever is provided for each bean pulling mechanism, and it will be obvious that by operating either lever, its respective mechanism, which includes a pair of upper and lower chains and disks, will be adjusted vertically relative to the ground. The pulling mechanisms are horizontally spaced to the extent that the adjacent stretches of the chains of each set may be spaced to a width corresponding to the distance between adjacent rows of vines. Furrow openers 23 are provided in advance of each of the pulling mechanisms, and one furrow opener 24, centrally of the frame and in advance of the wheel 3.

The rear sprockets 11 and 12, are disposed in a plane higher than the forward sprockets, and the chains are guided upon pulleys 25, located adjacent the pulleys so as to dispose the stretches of the chains between the pulleys, at an inclination. This arrangement is clearly brought out in Fig. 1.

A carrier 26 of the endless type, is supported upon chains 27 which pass around pulleys mounted at opposite ends in a carrier frame 28. Said carrier frame is inclined upwardly and rearwardly, with its forward end disposed in close relation to the rear sprockets of each of the pulling mechanisms. A sprocket 29 is mounted on the axle 2 adjacent each end thereof for engagement with each of the chains 27 whereby said carrier may be driven as the machine is drawn along the ground.

A transverse shaft 30 is journaled in the frame directly above the forward sprockets, and has mounted thereon a plurality of beveled gears 31, for engagement with the beveled gears 15 on the upper ends of the forward shafts 13. A beveled gear 32 is also mounted upon said shaft for meshing engagement with a beveled gear 33 mounted upon the end of a longitudinal shaft 34 journaled in the frame, and provided at its rear end with a beveled gear 35 which is adapted for meshing engagement with a beveled gear 36, fixed to the inner end of a transverse shaft 37 journaled for rotation in the frame. The outer end of the shaft 37 is provided with a sprocket 38 around which a chain 39 is passed, said chain also extending around a sprocket 40 rotatable with one of the ground wheels 41, which are mounted upon the axle 2, and support the rear end of the frame. Thus it will be seen that as the machine is drawn along the ground by a suitable tractive means, the rotative motion of the ground wheels is transmitted through the medium of the gearing just described to the chains of the vine pulling mechanism, whereby the adjacent stretchers of said chains are moved rearwardly and in unison toward the lower end of the carrier.

In view of the foregoing description, the operation of my machine should be obvious; it may be stated however that as the machine is drawn along the ground, with the space between adjacent stretches of each of the pulling mechanisms disposed in alinement with the rows of vines, the vines are drawn into said space by means of the fingers or teeth 18, and the stalks of the vines severed close to the ground by means of the cutting disks 6, the disks being of open formation so as to permit particles of earth drawn up with the vines to pass through said disks. The vines, thus having their connections with the earth severed, are deposited upon the endless carrier 26, and carried thereby to the upper end from which they are deposited upon the ground or in a suitable receptacle.

While I have illustrated and described my invention with some degree of particularity, I realize that in practice, various alterations thereover may be made, and I therefore reserve the right and privilege of changing the form of the details of construction, or otherwise altering the arrangement of the correlative elements, without departing from the spirit of the invention, or the scope of the appended claims.

Having thus described my invention what I claim as new and desire to secure by Letters Patent is:

1. A bean harvester including a wheel supported frame, a pair of disks disposed with their lower peripheries in engagement in close relation to the ground and supported for rotation beneath the frame with their sides disposed in upwardly diverging planes, a pair of vertically spaced chains for each disk, each disk extending through the upper and lower adjacent stretches of its respective chains, teeth on the chains whereby vines may be drawn through the horizontal space of each pair of chains to be severed by the disks, means for actuating the chains, a carrier for receiving the vines and means for actuating the carrier.

2. A bean harvester including a wheel supported frame, auxiliary frames mounted for vertical adjustment beneath the first mentioned frame, endless chains mounted on the auxiliary frames and in horizontal spaced relation with the stretches of said chains inclined rearwardly and upwardly, means for actuating the chains to draw vines into the spaces, disks having cutting edges disposed within the space and in the path of movement of the vines, an endless carrier inclined upwardly and rearwardly, with its forward end disposed beneath the rear ends of the chains, to receive the vines from said chains, and means for actuating the carrier.

3. A bean harvester including a main frame, supporting wheels therefor, auxiliary frames vertically movable beneath the main frame, longitudinal vine pulling chains and cutting disks mounted upon the auxiliary frames, a lever for adjusting the frames vertically, means for actuating the chains from the supporting wheels, a carrier frame mounted upon the main frame, a carrier mounted for movement in the frame, and means for actuating the carrier from the supporting wheels.

In testimony whereof I affix my signature in presence of two witnesses.

LOUIS A. GROJEAN.

Witnesses:
F. E. EMLAY,
E. S. WRIGHT.

Copies of this patent may be obtained for five cents each, by addressing the "Commissioner of Patents, Washington, D. C."